(12) United States Patent
Dupont

(10) Patent No.: US 8,749,779 B2
(45) Date of Patent: Jun. 10, 2014

(54) SPECTROMETER

(71) Applicant: Bio-Logic, Claix (FR)

(72) Inventor: Yves Dupont, Lans en Vercors (FR)

(73) Assignee: Bio-Logic, Claix (FR)

( * ) Notice: Subject to any disclaimer, the term of this patent is extended or adjusted under 35 U.S.C. 154(b) by 0 days.

(21) Appl. No.: 13/771,457

(22) Filed: Feb. 20, 2013

(65) Prior Publication Data

US 2013/0215416 A1    Aug. 22, 2013

(30) Foreign Application Priority Data

Feb. 20, 2012 (FR) ...................................... 12 00481

(51) Int. Cl.
*G01J 3/28* (2006.01)
(52) U.S. Cl.
USPC .......................................................... 356/326
(58) Field of Classification Search
USPC .................................. 356/51, 326, 328, 334
See application file for complete search history.

(56) References Cited

U.S. PATENT DOCUMENTS

| 5,986,758 A | 11/1999 | Lyons et al. |
| 6,919,960 B2 * | 7/2005 | Hansen et al. ................. 356/436 |
| 7,522,279 B1 | 4/2009 | Liphardt et al. |
| 8,094,306 B2 * | 1/2012 | Park et al. ..................... 356/328 |
| 2012/0127848 A1 * | 5/2012 | Saito et al. .................... 369/284 |

FOREIGN PATENT DOCUMENTS

GB        1 320 662        6/1973

* cited by examiner

*Primary Examiner* — Tarifur Chowdhury
*Assistant Examiner* — Abdullahi Nur
(74) *Attorney, Agent, or Firm* — Oliff PLC

(57) ABSTRACT

A spectrometer including a source emitting an electromagnetic radiation, a selection device configured for selecting a monochromatic radiation based on the electromagnetic radiation, a focusing device configured for defining a focusing point associated with a wavelength of the electromagnetic radiation emitted by the source and configured for displacing the focusing point with respect to an input of the selection device, a vessel containing a sample intended to receive the monochromatic radiation, and an analyzer of a radiation transmitted or emitted by the sample.

7 Claims, 1 Drawing Sheet

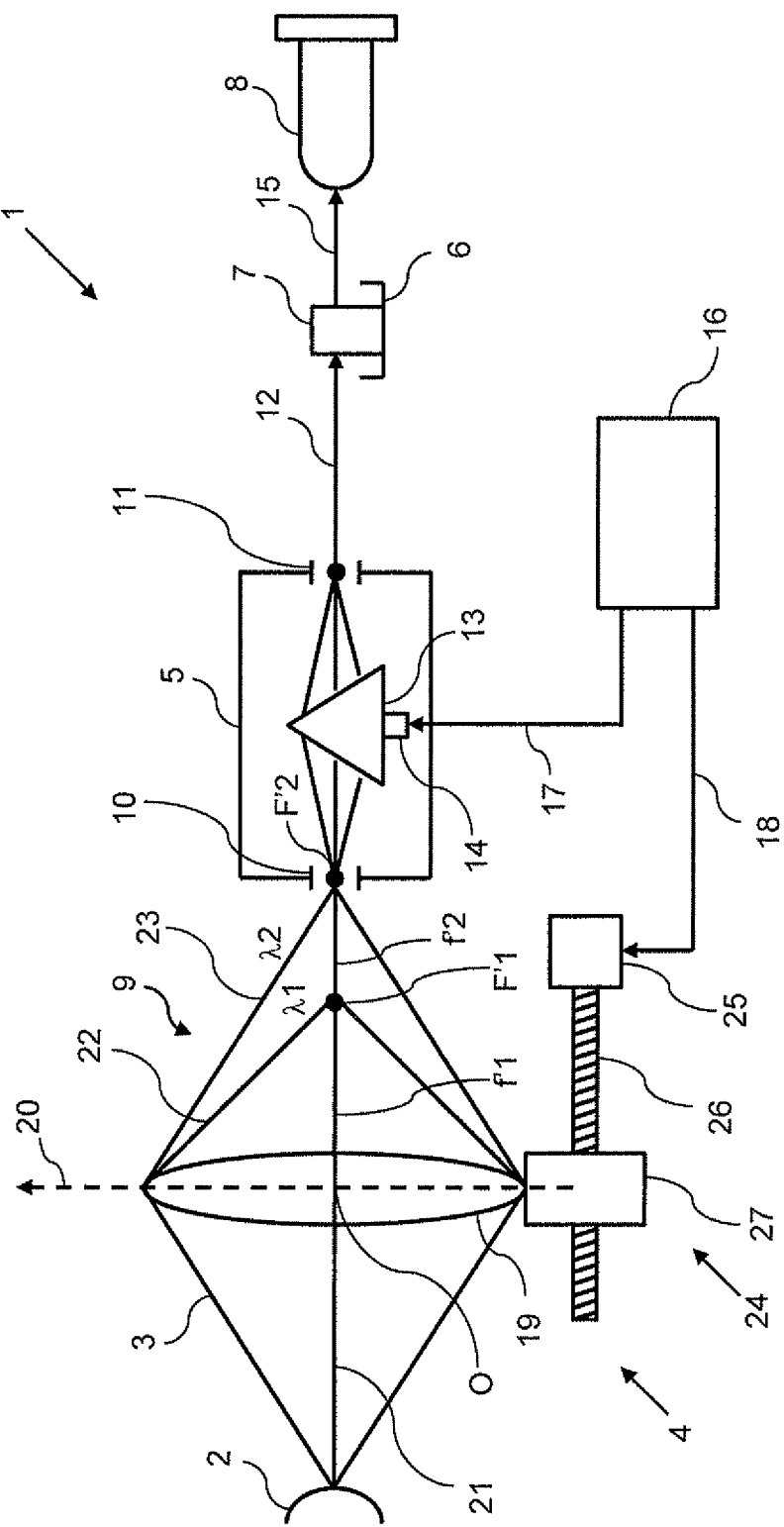

SPECTROMETER

FIELD OF THE INVENTION

The present disclosure relates to spectrometers, and in particular to spectrometers which use a polychromatic electromagnetic radiation having its wavelengths ranging between those of close infrared radiation and those of ultraviolet radiation.

STATE OF THE ART

A spectrometer is a device enabling to determine the composition or the physical properties of a sample based on the analysis of the nature of a radiation transmitted or emitted by the sample when it receives a radiation having a determined wavelength. The transmitted radiation corresponds to the portion of the radiation received by the sample which has not been absorbed. Emitted radiation here designates a radiation which is either reflected, or emitted by fluorescence. For example, a spectrometer enables to study the absorbance (or absorption capacitance), the circular dichroism, or the fluorescence of a sample.

A spectrometer generally comprises a source emitting a polychromatic electromagnetic radiation covering a sufficiently wide spectrum to study the different properties of the sample, for example, an ultraviolet lamp, or a lamp emitting a radiation in the visible range or in the close infrared range. A spectrometer also comprises a wavelength selection system (for example, a diffraction grating or prism monochromator) to select a specific wavelength of the electromagnetic radiation to illuminate the sample with the monochromatic radiation. Generally, a spectrometer further comprises optical systems for focusing the electromagnetic radiation emitted by the source to obtain a radiation having a maximum energy. The focusing of the radiation emitted by the source enables to improve the quality of the radiation transmitted towards the sample, and refines the analysis thereof.

Currently, optical systems achromatically focus the radiation emitted by the source on an entrance slit of the monochromator, that is, for all the wavelengths of the emitted radiation. The disadvantage of such systems is that useless wavelengths of the emitted radiation disturb the monochromator, decrease its lifetime, or even adversely affect its performance.

The focusing means may comprise elliptic mirrors which are particularly adapted to spectrometers which use a wide wavelength spectrum, for example, from ultraviolet to close infrared. However, such mirrors are fragile, since their coating poorly resists in oxidizing conditions and imposes working in the absence of oxygen. Indeed, the ultraviolet radiation emitted by the source reacts with oxygen to form ozone, which is particularly oxidizing, and which very rapidly damages the mirror coating. Accordingly, spectrometers which use ultraviolet radiations absolutely have to house such elliptic mirrors in confinements with a neutral gas of nitrogen or argon type, or under vacuum.

The focusing means may comprise one or several glass or quartz lenses. However, these lenses have different refraction indexes respectively according to the wavelengths of the radiation emitted by the source and in particular according to the wavelengths of the ultraviolet radiation. The lenses are thus intended for spectrometers with a limited spectrum, for example, spectrometers in the visible or close infrared range, and are never used for ultraviolet spectrometers.

OBJECT OF THE INVENTION

An object of the present invention comprises overcoming these disadvantages, and more specifically providing a spectrometer having a wide useful radiation spectrum for a fine analysis of a sample.

Another object of the present invention comprises providing a spectrometer which is of simple use and which efficiently operates with an ultraviolet radiation.

An aspect of the present invention provides a spectrometer comprising a source emitting an electromagnetic radiation, focusing means for focusing the radiation emitted by the source, selection means for selecting, based on a focused radiation, a monochromatic radiation, a vessel containing a sample intended to receive the monochromatic radiation, and an analyzer of a radiation transmitted or emitted by the sample, characterized in that the focusing means have at least one variable focusing associated with a determined wavelength of the emitted radiation.

Thus, the energy of the radiation having a determined wavelength is increased to obtain a better quality of the monochromatic radiation at the output of the selection means. A spectrometer having a better accuracy in the analysis of the sample characteristics is thus obtained.

The wavelengths of the emitted electromagnetic radiation may range between those of ultraviolet radiation and those of close infrared radiation.

The selection means may comprise an entrance slit configured to receive the focused radiation, and the focusing means comprise one or several lenses and motor-driven means capable of displacing the lens(es) so that a focal distance associated with a determined wavelength of the emitted radiation coincides with the entrance slit.

Thus, to obtain an accurate focusing of a radiation having a given wavelength on the entrance slit of the selection means, it is done away with the need to motorize the monochromator, the vessel, and the analyzer altogether. Indeed, for a correct analysis of the radiation transmitted or emitted by the sample, the wavelength selection means must be in a fixed position with respect to the sample and with respect to the analyzer. Further, the use of conventional lenses which are insensitive to ozone corrosion avoids having to use an inert gas confinement, while using an ultraviolet radiation source. Advantageously, the spectrometer performance is improved by focusing a monochromatic radiation having a useful wavelength, that is, a wavelength equal to that of the radiation emitted at the output of the selection means. The other radiations which have a wavelength different from the useful wavelength are defocused, in other words, focused ahead of or behind the entrance slit of the selection means, which avoids unnecessarily irradiating the internal components thereof.

The spectrometer may further comprise control means for controlling the focusing means to focus a radiation having a determined wavelength onto the entrance slit, and to control the selection means to select a monochromatic radiation having a wavelength equal to said determined wavelength.

Thus, the focusing of a radiation having a determined wavelength can be synchronized with the selection means for selecting said determined wavelength.

BRIEF DESCRIPTION OF THE DRAWING

The foregoing and other features and advantages of the present invention will be discussed in detail in the following non-limiting description of specific embodiments in connection with the accompanying drawing, where FIG. 1 schematically illustrates a spectrometer according to the present invention.

DETAILED DESCRIPTION

FIG. 1 shows a spectrometer 1 comprising a source 2 emitting an electromagnetic radiation 3. Spectrometer 1 further comprises focusing means 4, wavelength selection means 5, a vessel 6 containing a sample 7 to be analyzed, and an analyzer 8 for analyzing the physical properties of sample 7.

Source 2 is a source of a polychromatic wide spectrum radiation ranging from ultraviolet to close infrared, or a lamp of more limited spectrum having a radiation limited to the visible range. For example, source 2 may be a xenon lamp which emits a radiation having its wavelengths ranging between 170 nm and 1,000 nm, or a halogen lamp emitting a radiation having wavelengths ranging between 400 nm and close infrared, which is limited to approximately 2,000 nm, or an ultraviolet lamp such as a deuterium lamp having its wavelengths ranging between 160 nm and 400 nm.

Focusing means 4 focus emitted radiation 3 and transmit a focused radiation 9 towards an entrance slit 10 of selection means 5, to obtain a maximum energy of the radiation for a proper operation of selection means 5.

Selection means 5 enable to select a determined wavelength to transmit, on an exit slit 11, a monochromatic radiation 12 towards sample 7. Selection means 5 for example comprise a prism 13 or a diffraction grating, which receives focused radiation 9 and which emits monochromatic radiation 12 through exit slit 11. Prism or diffraction grating 13 may be oriented by means of a motor 14 to emit a monochromatic radiation 12 having a determined wavelength on exit slit 11.

Sample 7 receives monochromatic radiation 12 and emits a radiation 15, corresponding to a transmitted or emitted radiation, according to its physical properties, towards analyzer 8.

Further, spectrometer 1 comprises control means 16 for controlling, via a connection 17, motor 14 of prism 13, or of the diffraction grating. Control means 16 are further configured to control, via a connection 18, focusing means 4.

According to a preferred embodiment, focusing means comprise a lens 19 having a main axis 20, an optical center O, and an optical axis 21. Lens 19 is conventional, and preferentially converging. Further, it comprises different refraction indexes $n_i$ respectively associated with the different wavelengths $\lambda i$ of emitted electromagnetic radiation 3. FIG. 1 shows a lens 19, and the optical paths corresponding to two different refraction indexes n1 and n2 for simplification purposes. FIG. 1 shows a first radiation 22 focused on a first focal point F'1, at a first focal distance f1 and having a first wavelength $\lambda 1$. A second radiation 23 focused on a second focal point F'2, at a second focal distance f2 and having a second wavelength $\lambda 2$, has also been shown. In the illustrated embodiment, second wavelength $\lambda 2$ is greater than first wavelength $\lambda 1$.

Focusing means 4 further comprise motor-driven means 24 for displacing, by translation along optical axis 21, lens 19 with respect to entrance slit 10. In a preferred embodiment, the rule guiding the displacement of lens 19 is a function of the refraction index variation of lens 19 according to the wavelength. The motor-driven means comprise a motor 25 which drives a screw 26 for shifting a support 27 having lens 19 fixedly mounted thereon.

When sample 7 is desired to be illuminated with a monochromatic electromagnetic radiation 12 having a wavelength $\lambda 2$, prism or diffraction grating 13 is directed, by means of control means 16 to select monochromatic ray 12 having said wavelength $\lambda 2$. Then focusing means 4 are synchronized via control means 16 to displace lens 19 so that second focal point F'2 accurately coincides with entrance slit 10 of the selection means, in other words that the image focal plane associated with wavelength $\lambda 2$ coincides with the plane of entrance slit 10 of selection means 5. In particular, lens 19 is shifted along optical axis 21. It should be noted that in FIG. 1, second focal distance f'2, and second focal point F'2 coincide with entrance slit 10. Thereby, the maximum energy of the second focused radiation 23 is transmitted to selection means 5.

When another wavelength $\lambda 1$ is desired to be used, to study another physical property of sample 7, prism or diffraction grating 13 is directed to select another monochromatic radiation 12 having a wavelength equal to $\lambda 1$. Then, lens 19 is shifted to come closer to entrance slit 10 all the way until first focal point F'1 coincides with entrance slit 10.

Thus, a spectrometer provided with focusing means enabling to accurately focus a monochromatic radiation 22, 23 onto entrance slit 10 of wavelength selection means 5 is provided. Further, entrance slit 10 may be sufficiently narrow to let through a radiation 22, 23 having a wavelength equal to a determined wavelength. The other radiations having different wavelengths are focused behind and ahead of it and only a very small proportion of such spurious radiations penetrate into selection means. This especially enables to protect the internal components of selection means 5.

The invention claimed is:

1. A spectrometer comprising:
   a source emitting an electromagnetic radiation,
   a selection device configured for selecting a monochromatic radiation based on the electromagnetic radiation,
   a focusing device configured for defining a focusing point associated with a wavelength of the electromagnetic radiation emitted by the source and configured for displacing the focusing point with respect to an input of the selection device,
   a vessel containing a sample intended to receive the monochromatic radiation, and
   an analyzer of a radiation transmitted or emitted by the sample, wherein
   the selection device comprises an entrance slit configured to receive the focusing point, and the focusing device comprises at least one lens and a motor-driven device configured for displacing the at least one lens so that a focal distance associated with a wavelength of the electromagnetic radiation emitted by the source coincides with the entrance slit.

2. The spectrometer according to claim 1, wherein the source is configured for emitting a plurality of wavelengths ranging from ultraviolet radiation and close infrared radiation.

3. The spectrometer according to claim 2 further comprising a control device configured for controlling the focusing device to focus an electromagnetic radiation having a wavelength onto the entrance slit, and to control the selection device to select a monochromatic radiation having a wavelength equal to the wavelength of the electromagnetic radiation focused by the focusing device.

4. The spectrometer according to claim 2, further comprising a control device configured for controlling the focusing device to focus an electromagnetic radiation having a wavelength onto the entrance slit, and to control the selection device to select a monochromatic radiation having a wavelength equal to the wavelength of the electromagnetic radiation focused by the focusing device.

5. The spectrometer according to claim 1, further comprising a control device configured for controlling the focusing device to focus an electromagnetic radiation having a wavelength onto the entrance slit, and to control the selection device to select a monochromatic radiation having a wavelength equal to the wavelength of the electromagnetic radiation focused by the focusing device.

6. The spectrometer according to claim 1, wherein the at least one lens has an optical center that lets through the electromagnetic radiation emitted by the source towards the entrance slit.

7. The spectrometer according to claim 6, wherein the source is configured for emitting a plurality of wavelengths ranging from ultraviolet radiation to close infrared radiation.

* * * * *